US006401528B1

(12) United States Patent
Lambert et al.

(10) Patent No.: US 6,401,528 B1
(45) Date of Patent: Jun. 11, 2002

(54) ANALYZER OF A VEHICLE'S EVAPORATIVE EMISSIONS

(75) Inventors: David Kay Lambert, Sterling Heights; Dean A. Drake, Fenton; Peter John Groblicki, Shelby Township, Macomb County, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/397,326

(22) Filed: Sep. 16, 1999

(51) Int. Cl.[7] .............................................. G01M 19/00
(52) U.S. Cl. ...................................................... 73/118.1
(58) Field of Search ................................ 73/118.1, 116, 73/23.31, 117.3

(56) References Cited

U.S. PATENT DOCUMENTS 5,431,042 A * 7/1995 Lambert et al. .............. 73/116
5,750,886 A 5/1998 Lambert et al. ........... 73/117.3
6,089,081 A * 7/2000 Cook et al. ................ 73/118.1

* cited by examiner

*Primary Examiner*—Benjamin R. Fuller
*Assistant Examiner*—Maurice Stevens
(74) *Attorney, Agent, or Firm*—Jeffrey A. Sedlar

(57) ABSTRACT

A process and apparatus are disclosed for estimating evaporative fuel emission losses from a vehicle having a hydrocarbon-fueled engine operating under control of a microprocessor-based powertrain controller, a fuel tank with an evaporated fuel emission control system comprising a fuel vapor adsorbtion means connected to the tank and engine, and a diagnostic system that detects malfunctions in the vapor adsorbtion means. The process and apparatus measures temperature inside the vehicle passenger compartment at successive times when the engine is not running and determines the lowest temperature during partial diurnal and diurnal cooling cycles and uses such temperature along with any malfunction data to estimate evaporated fuel loss during a test period.

10 Claims, 5 Drawing Sheets

ANALYZER OF A VEHICLE'S EVAPORATIVE EMISSIONS

TECHNICAL FIELD

This invention pertains to a method and apparatus for estimating the amount of evaporative fuel emissions from a vehicle during a test period.

BACKGROUND OF THE INVENTION

Light duty automotive vehicles sold in the United States since the 1996 model year have been required to incorporate an on-board self-diagnostic system that satisfies the U.S. federal OBDII requirements. The self-diagnostic systems comprise sensors and a microprocessor to monitor various vehicle systems including its exhaust and fuel evaporative emission control systems. As previously disclosed in U.S. Pat. Nos. 5,431,042 and 5,750,886, it is possible to monitor an automotive vehicle's operation while the engine is on by using standard diagnostic messages to periodically poll the engine controller.

In accordance with the disclosures of the '042 and '886 patents, a microprocessor module that is connected to the diagnostic link and to the engine or powertrain controller sends and receives messages that are used in the practice of those inventions. Running totals are kept in the module's non-volatile memory of values that can be used to estimate the vehicle's cumulative exhaust emissions of carbon monoxide, hydrocarbons and nitrogen oxides. For example, specific quantities monitored by the module in accordance with these patents include the number of engine starts binned by the temperature of the engine coolant at the time of the start, the total time of engine operation, the total time the engine is operated in driver commanded enrichment mode, and the distance traveled with the vehicle malfunction indicator light (MIL) on for various OBDII classes of malfunctions.

The functional relationship between the cumulative totals collected in the exhaust analyzer module and the cumulative emission of a given pollutant from a particular vehicle can be based on mathematical models that have been developed to estimate, for example, the total emissions in an air basin from all the vehicles operating in it. One such model is EMFAC that was developed by the California Air Resources Board. Another model is Mobile 6 that is being developed by the U.S. Environmental Protection Agency. Thus, data accumulated by the practices of the '042 and '886 patents may, for example, be stored on-board in the described microprocessor module and downloaded by a technician for use in such a model to estimate the cumulative exhaust emissions of the vehicle over a test period. Another use of the patent practices is to apprise the driver of the effects of his operation of the vehicle on such emissions.

Evaporative emissions from individual vehicles are also an important component of the hydrocarbon emissions inventory from a motor vehicle fleet. Hydrocarbon emissions are regulated because they are a precursor to ozone formation. The chemical reaction that converts hydrocarbons and nitrogen oxides into ozone is promoted by high ambient temperature. High ambient temperature also increases the evaporative emissions of hydrocarbons. On some days that the Los Angeles air basin has exceeded the allowed concentration of ozone, it has been estimated that more than half of the hydrocarbon inventory resulted from fuel evaporated from vehicles. Much of the evaporative emissions come from older vehicles without evaporative controls or from vehicles with leaks or malfunctioning controls.

Gasoline engine-powered vehicles are susceptible to evaporative fuel loss because of the volatility of the fuel. The temperature in the fuel tank increases due to ambient heating of the fuel, or to hot fuel returned from the engine compartment, and can cause the liquid fuel to vaporize. Current gasoline tanks are vented through a tube that conducts evaporated fuel to a carbon particle-filled canister in the engine compartment of the vehicle. Gasoline hydrocarbons are temporarily adsorbed on the carbon particles to reduce or eliminate release of the hydrocarbons to the atmosphere. At suitable times during engine operation, the engine controller signals the opening of a canister purge valve to engine vacuum. Ambient air is thus permitted to flow through the canister, removing stored hydrocarbons and carrying them into the engine where they are burned. The complete avoidance of release of evaporated fuel to the atmosphere depends upon such purging of stored fuel from the canister before it is overloaded and discharges fuel to the atmosphere and upon the detection and closing of other leaks in the evaporative emission control system.

Evaporative emissions from vehicles are thus attributed to the following general categories. Diurnal emissions are those occurring when the engine is not running and driven by the daily cycle of ambient temperature increase and decrease. If the diurnal cycle is interrupted by engine start-up, a partial diurnal loss period may have to be considered. The analysis of emission losses thus contemplates an engine-off resting period which is the baseline measured during the test for diurnal emissions. The quantity of resting emissions is sometimes modeled as a function of the lowest temperature occurring during the resting period. There is also a hot soak category that includes emissions that occur shortly after the engine is turned off. The running loss category includes those evaporative emissions that occur while the engine is running and during the hot soak period. There are also leaks of liquid fuel.

Practices disclosed in the above patents can be used to estimate running loss and hot soak emissions because they are related to engine-on data. However, there remains a need for methods and apparatus for collecting suitable information during periods when the engine is not running to estimate evaporative emissions attributable to diurnal and partial diurnal losses as well as losses attributable to malfunctions of the evaporative emission control system. Such information would be used with a module like EMFAC and Mobile 6 to determine evaporative emissions during a test period.

SUMMARY OF THE INVENTION

The invention provides a method of determining cumulative evaporative emissions of hydrocarbons from an automotive vehicle during a test period, suitably when the engine is not running. The vehicle has an engine that is operated under a microprocessor-based engine controller and a fuel evaporation emission control system comprising a fuel tank for hydrocarbon fuel and fuel vapor adsorption means connected to said tank and said engine. The adsorption means is usually a canister of carbon particles used to temporarily store evaporated hydrocarbons flowing from the fuel tank. When the engine runs, engine vacuum promotes air flow through the canister into the engine to strip hydrocarbons from the canister and carry them into the combustion cylinders of the engine where they are burned. Preferably, the vehicle also has a self-diagnostic system (e.g., as required under OBDII) that detects malfunctions in said evaporation emission control system.

An evaporative emissions microprocessor based module is provided including suitable memory and input-output components and a temperature sensor to practice the process aspect of the invention. The module is connected with suitable data links to the engine controller, the self-diagnostic system, if present and, preferably to a download port for outside the vehicle processing of the evaporative emission data acquired during a vehicle test. The emission module including a temperature sensor is suitably located in the passenger compartment behind the vehicle instrument panel. Optionally, the temperature sensor could be located in the fuel tank.

In a preferred embodiment, the process comprises periodically interrogating said diagnostic system during engine operation for defects in said emission control system and recording said defects, if any, in a microprocessor readable memory. The module sensor is used to measure the temperature at regular, predetermined intervals of time during all occasions during a test period when the engine is not running. The temperature is recorded in a readable memory preferably after a predetermined engine off hot soak period. After a suitable period, preferably after 24 hours, the lowest recorded temperature is determined as a basis for diurnal or partial diurnal cumulative emission determinations.

Meaningful temperature data is thus accumulated during a vehicle test of desired length. Diagnostic data pertaining to the performance of the evaporative control system is obtained by the emissions module from the vehicle OBDII system, if present, during vehicle operation. Most of the temperature data is recorded in the module when the engine is not running. Preferably, any single engine-off test period is terminated after a predetermined period, such as about three days, to prevent excessive battery drain.

The cumulative evaporative emissions during said test period are then determined as a function of the cumulative effect of said malfunctions, if any, and the cumulative effect of said diurnal and partial diurnal temperatures. There are suitable mathematical evaporative emission models for the purpose of the determination. The models may be loaded into the memory of the evaporative emissions model. Preferably, however, the data from the emissions module is downloaded upon demand to an external processor for the calculation of the evaporative emissions during the test period.

Other objects and advantages of the invention will become more apparent from a detailed description of a preferred embodiment, which is provided below. Reference will be had to the drawing figures which are described in the next section.

DESCRIPTION OF PREFERRED EMBODIMENTS

Figure 1:
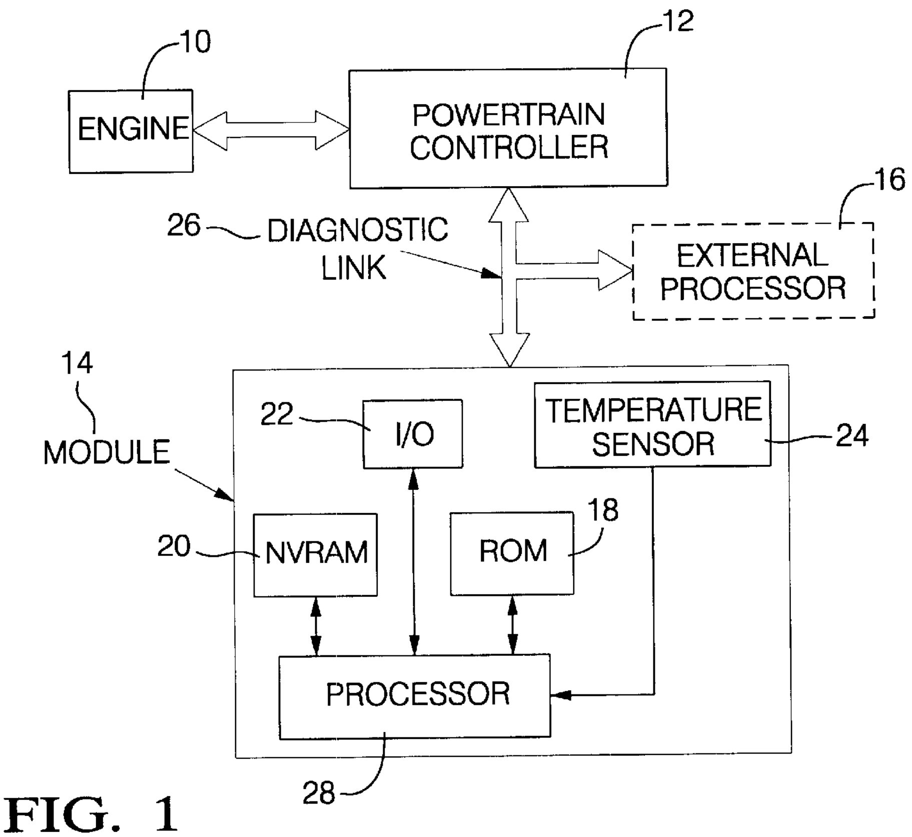
FIG. 1 is a general diagram of engine hardware and electrical architecture of the systems used to analyze a vehicle's evaporative emissions of hydrocarbons.
Figure 2:
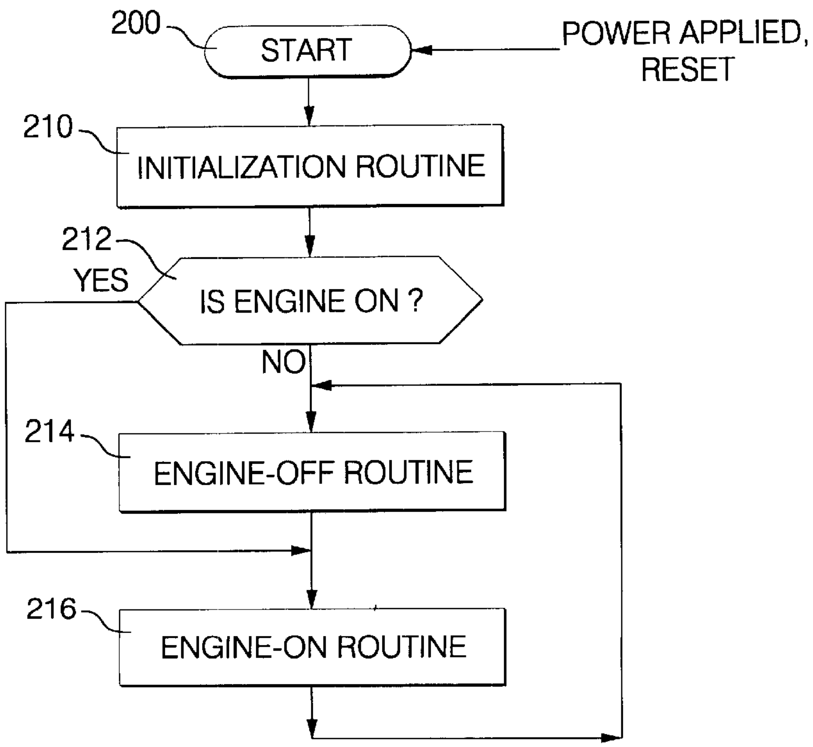
FIG. 2 is a computer flow diagram of an overall process of this invention.

A specific embodiment of the electrical architecture of a processor for use in the present invention is shown in FIG. 1. The vehicle whose evaporative emissions are to be tested has an engine 10 under the control of a powertrain or engine control module 12. An evaporative emissions analyzer module for use in accordance with this invention to analyze a vehicle's hydrocarbon evaporative emissions is indicated generally at 14. As indicated in FIG. 1, there is a diagnostic electrical data link 26 between the subject evaporative emissions module 14 and the powertrain controller 12. In addition, there is an optional external microprocessor 16 for use in downloading data from the subject module 14.

Spark-ignited, hydrocarbon-fueled engines like that indicated at 10 are made and used in millions of vehicles throughout the world. Most of the recently manufactured vehicles with such engines have a microprocessor-based controller module that controls functions of the engine as well as possibly the transmission of the vehicle. A modern engine is assembled with a number of engine operating parameter sensors (not shown) that are connected electrically to the powertrain controller 12. The powertrain controller 12 is activated in response to application of ignition power to the engine and the controller. Included in the operating parameters of the engine under control or surveillance by the powertrain controller are engine coolant temperature, engine speed and RPM, ambient air temperature, crankshaft position, spark timing and the like.

When activated, the powertrain controller engages in control operations including reading of the operating parameters from the sensors and generating and issuing control commands in response thereto to various conventional powertrain control actuators (not shown).

The controller 12 also communicates with other external devices such as, in this embodiment, evaporative emissions module 14.

Evaporative emissions module 14 includes a read-only memory 18, a nonvolatile random access memory 20 and input/output (I/O) unit 22. The module includes a suitable microprocessor 28 and temperature sensor 24. In a preferred embodiment, the temperature sensor 24 is a thermistor that is electrically biased so that the voltage across the thermistor is a known function of temperature. The thermistor voltage is input to an analog-to-digital converter in the microprocessor 28. The evaporative emissions module 14 may be located, for example, behind the instrument panel in the passenger compartment of the vehicle.

I/O device 22 may in accordance with one aspect of this invention correspond to a commercially-available PCMCIA interface or scan tool connected to the powertrain controller 12 through a data link 26. Data link 26 may take the form of a conventional serial data link having a data link connector such as a S.A.E. specified J1969 connector in a passenger compartment for connecting the module 14 with the controller 12. Data link 26 is a conventional two-way communication bus which, for example, may be a bi-directional serial data link set up to communicate at 10.4 Kb/s in the manner described in S.A.E. standard J1850 or ISO standard 9141-2. Data passed from the powertrain controller along the link to the emissions module 14 is passed to the I/O unit 22 thereof.

Information pertaining to the evaporative emissions estimation performed in accordance with this invention is stored in the NVRAM device 20 of the module 14 and upon request is downloaded through the I/O unit 22 to the external analyzer 16 for further processing to be described.

The external analyzer may include its own storage and display means of a conventional type for retaining and displaying vehicle emission information. The external analyzer may include means for receiving the downloaded data, for passing the data through a model to estimated emissions over a test period, and for communicating or displaying the emissions estimate. It is envisioned that such an external analyzer may be applied to monitor or regulate discretionary operator behavior that impacts emissions.

It is intended that the analyzer module 14 will be powered by the vehicle battery and will be capable of intermittent operation both during the vehicle's engine operation and at times when the vehicle's engine is not operating during a test period. The emissions module also has a clock in microprocessor 28 which is utilized in the process of this invention.

The vehicle also is provided with an OBDII system that is employed for the purpose of detecting malfunctions both in the exhaust gas treatment system and in the evaporative emission system of the vehicle. This invention utilizes the OBDII system with respect to its detection of malfunctions in the operation of the evaporative system, as will be described below. Representative of these malfunctions is a test to see if the solenoid valve that permits purging of the evaporative emissions storage canister is effective. This is the so-called purge test (sometimes PURGE in the drawing figures), and if the solenoid valve is not working properly, it causes a purge malfunction. A second test that the diagnostic system conducts on the evaporative emission system is a pressure test to see if the system will maintain a vacuum or reduced pressure during engine operation at the time that the purge air inlet is closed. This test is a Pressure Test for determining whether there are leaks in the evaporated vapor line that would produce unintended evaporative emissions.

Evaporative Emissions Analysis Process

FIGS. 2–10 constitute a main flow chart (FIG. 2) and eight subroutine flow charts (FIGS. 3–10). The process routines depicted in FIGS. 2–10 provide data pertaining to resting loss evaporative emissions (i.e., diurnal and partial diurnal evaporative emissions) and excess evaporative emissions caused by malfunctions that would be detected either by the "purge-test" or the "pressure test" undertaken by the vehicle's OBDII system. This embodiment of the invention is based on the assumption that the minimum temperature during a previous 24 hour period occurred during the night when the ambient temperature and the temperature measured inside module 14 were approximately equal. Temperatures at other times are deduced from the minimum temperature determined by the module with the use, for example, of the EPA's diurnal temperature cycle. The minimum temperature of the EPA cycle is taken to occur at the same time as the earliest measurement of the minimum temperature recorded during the preceding 24 hours.

Other sources of evaporative emissions that are not considered as a part of this process are running loss evaporative emissions and hot soak evaporative emissions. Running loss emission occurs while the engine is on, and it is determined directly from data collected by a process as disclosed, for example, in the '042 patent identified above. Similarly, every hot soak is associated with an engine start, so hot soak evaporative emissions can also be determined directly from data collected in the practice disclosed in the '042 patent. The "hot soak" period is arbitrarily set at two hours following an engine shut off.

Neither the OBDII system nor the process of this invention is able to detect malfunctions of the evaporative system that involve small liquid leaks.

Referring to the main flow chart (FIG. 2), the process is started, block 200, when power is applied to module 14 to commence evaporative emissions loss analysis or if the module is reset during a test. The process progresses to the initialization subroutine, block 210, which is illustrated in full in FIG. 3. Upon completion of the initialization routine, the process tests whether the engine is running, block 212. If the engine is not running, the process flows to the engine off routine, block 214, which is fully disclosed in FIG. 4. If the engine is on, the process flows to the engine on routine, block 216, which is fully disclosed in FIG. 5. As will be seen, the engine off and engine on routines interact so that the process cycles within blocks 212, 214 and 216 of FIG. 2 until the test is completed and the module 14 is shut off.

Figure 3:
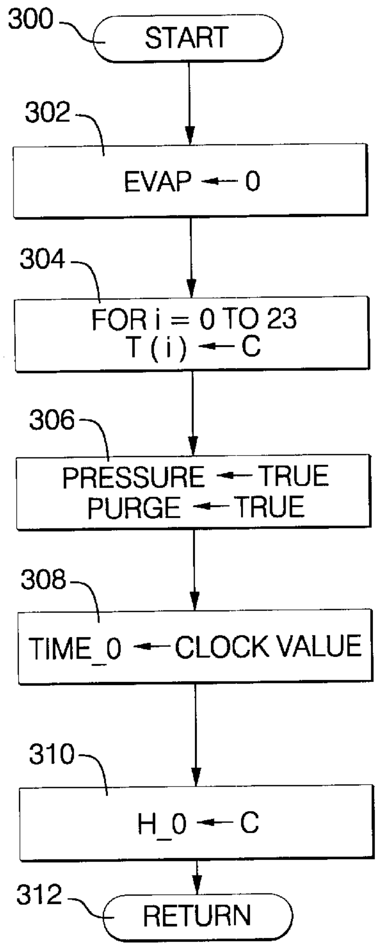
FIG. 3 is a computer flow diagram of an initialization subroutine.

FIG. 3 illustrates the computer process flow through the initialization routine (block 210 in FIG. 2) for module 14. In this subroutine, certain memory locations are given initial values. Beginning at block 300, the initialization process flows to block 302 in which the memory location for EVAP is set to zero. EVAP represents the cumulative quantity of hydrocarbon vapor that has been emitted from the vehicle. This memory value is initialized to zero. The initialization process then flows to block 304 to an array of 24 temperature memory elements T(i). These temperature memory elements are associated with specific time intervals where i has values from zero to 23. These are values of the module's temperature during a "day" at 24 hourly intervals. Each of these 24 temperature values T(i) are initialized by a quantity "C". The quantity "C" is used by this program to indicate that the initial value is undefined. It is a number chosen to be greater than any possible temperature value that might be measured by the temperature sensor 24. Although 24 hourly intervals have been selected in accordance with block 304, it is appreciated that a day could be broken up into other convenient time units of equal duration.

The initialization process then proceeds to block 306 which deals with evaporative emission OBDII malfunction issues. The two issues in this illustration are PURGE and PRESSURE. The memory sites for these issues are set as true, meaning that there are pressure and purge problems. If in fact these problems do not exist, these values will be changed in further processing as will be seen.

Proceeding then to block 308, the initial time TIME_0 is given a present clock value. The clock value is whatever time (to the fraction of a second) that presently exists in the clock of the microprocessor 28. It is not necessarily zero. TIME_0 marks the beginning of an evaporative emissions test.

Proceeding to block 310, the initial value for hour zero of the test, H_0, is given the same undefined quantity C that was used to initialize the temperatures at respective test intervals. The initial H_0 will be established later on as will be seen. Hour values are integers, e.g., up to 72 for three days.

Figure 4:
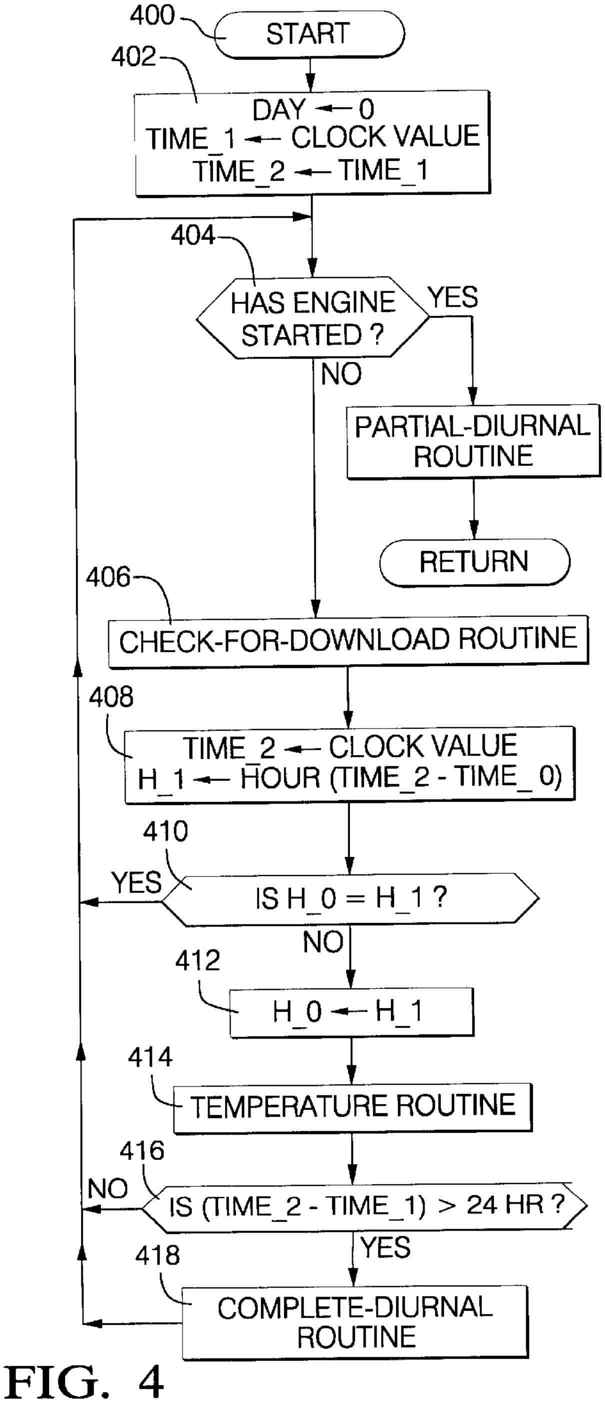
FIG. 4 is a computer flow diagram of an engine-off subroutine.
Figure 5:
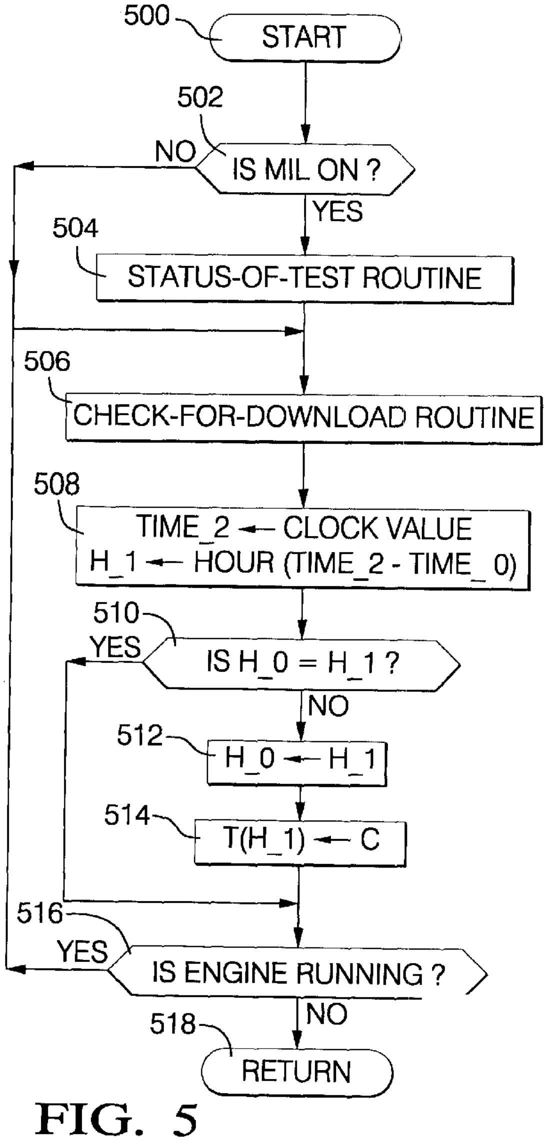
FIG. 5 is a computer flow diagram of an engine-on subroutine.

The initialization routine is now complete at block 312. The process returns to the main flow diagram in which the test is made, block 212, as to whether or not the engine is on. If the engine is off, the process flows to the engine-off routine, block 214. The engine-off routine is depicted in FIG. 4. If the engine is on, the process flows to block 216. The engine-on routine is depicted in FIG. 5. Reference will first be made to the engine-off routine illustrated in FIG. 4.

Engine-Off Routine

In this subroutine, the engine-off process begins at block 400. The flow proceeds to block 402 where certain memory initialization steps are performed. The DAY variable is initialized at zero. The first time value, TIME_1, is initialized at the present microprocessor clock value. TIME_1 is the first engine-off time recorded during the emissions test. The second time value, TIME_2, is initialized with a value that is the same as the first time value, TIME_1. The process flow then proceeds to block 404 in which the process inquires whether the engine has started since the previous engine-off/engine-on test. It is assumed that the engine has not started at this point of the description, and the flow proceeds to block 406, which is a "check-for-download" routine. The check-for-download routine is described in FIG. 6. Basically, the check-for-download routine is to respond to a request for evaporative emissions test data acquired in accordance with the invention up to the present time. It is assumed at this stage of the description that no such request has been made since, in this example, the test period just started. The process flows to block 408.

In block 408, TIME_2 is given the present clock value. Then, the calculation is made of the difference between Time_2 and Time_0 (elapsed time from test start) for determining the hour variable, H_1. The values of hour must be integrals so if the difference between Time_2 and Time_0 is less than one hour, the difference is 0. In any event, the integral value of hour at this stage of the engine-off interval is stored in the variable H_1.

The process then proceeds to block 410 in which the test is made as to whether the variable H_0 is equal to H_1. Since H_0 was initialized as C (undefined) and H_1 has an integer value, at the first pass through block 410, the response is "no". In that case, H_0 is given the value of H_1 at block 412, and the process flows to the temperature routine at block 414. The temperature subroutine is described in connection with FIG. 7. The temperature subroutine determines whether a recordable temperature has been achieved. For purposes of this illustration, it is assumed that the engine has not been shut off long enough to obtain a recordable temperature.

The process then proceeds to block 416 where it is tested to determine whether the time that has elapsed within this subroutine is greater than 24 hours, the minimum time for a complete diurnal routine. If less than a day has elapsed, the process recycles to block 404. If more than a day has elapsed in the test and since the engine was last started, then the process flows to the complete-diurnal routine which is described in detail in FIG. 8. Assuming that the engine has not been started (the block 404 test), the engine-off routine cycles between blocks 404 and 416 until the engine is started, or a day is completed. As time elapses, module temperatures are stored (FIG. 7) in T(H) memory locations.

Figure 6:
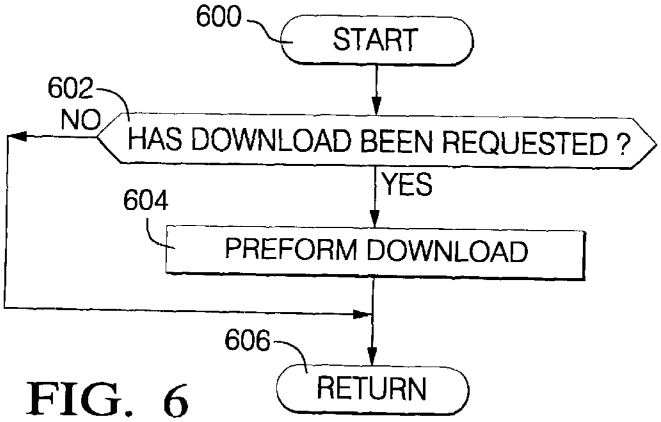
FIG. 6 is a computer flow diagram of a check-for-download subroutine.
Figure 7:
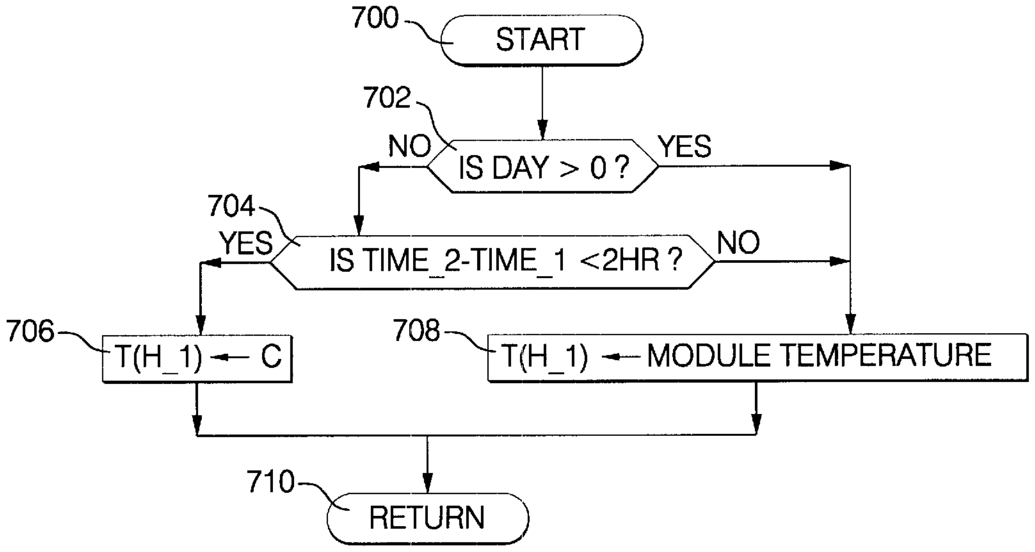
FIG. 7 is a computer diagram of a temperature subroutine.

Some of the subroutines that are a part of the engine-off routine will now be described. Referring to FIG. 6, the check-for-download routine begins at block 600 and flows to a test block 602 inquiring whether a download of the data from this program has been requested. If a download of evaporative emissions data has been requested, the process flows to block 604 where the download of EVAP is performed to an external diagnostic program or the like. The flow sequence then goes to the return block 606 which returns this subroutine to the engine-off routine (FIG. 4).

Block 414 in the engine-off sub-routine of FIG. 4 directs the process into the temperature routine. The temperature routine is described in FIG. 7. The temperature routine begins at block 700 and flows to a test block 702 where it is determined whether the value of DAY is greater than 0. If the variable for DAY is not greater than 0, then the process flows to block 704 which tests whether the difference between Time_2 and Time_1 (engine-off time) is less than two hours. If the elapsed time is less than two hours (the allowance for hot soak after engine shut off), the process flows to block 706 where an undefined temperature is entered in the memory designation for the temperature at T(H_1). If the elapsed time is greater than two hours, the process flows to block 706 where the actual temperature of the module 14 is stored in the location for the temperature at T(H_1). The temperature routine then returns to the engine-off routine (FIG. 4) from block 710.

The process cycles through the engine-off routine with the passage of time and the success of cycles of the processor until it is either determined that the engine has started at block 404 or that the elapsed time, that is, Time_2 minus Time_1, is greater than 24 hours at block 416. Assuming that the engine has not started and that the elapsed time now exceeds 24 hours, the engine-off routine process flows to block 418. From block 418, the process is directed to the complete diurnal process.

The Complete Diurnal Subroutine Process

Figure 8:
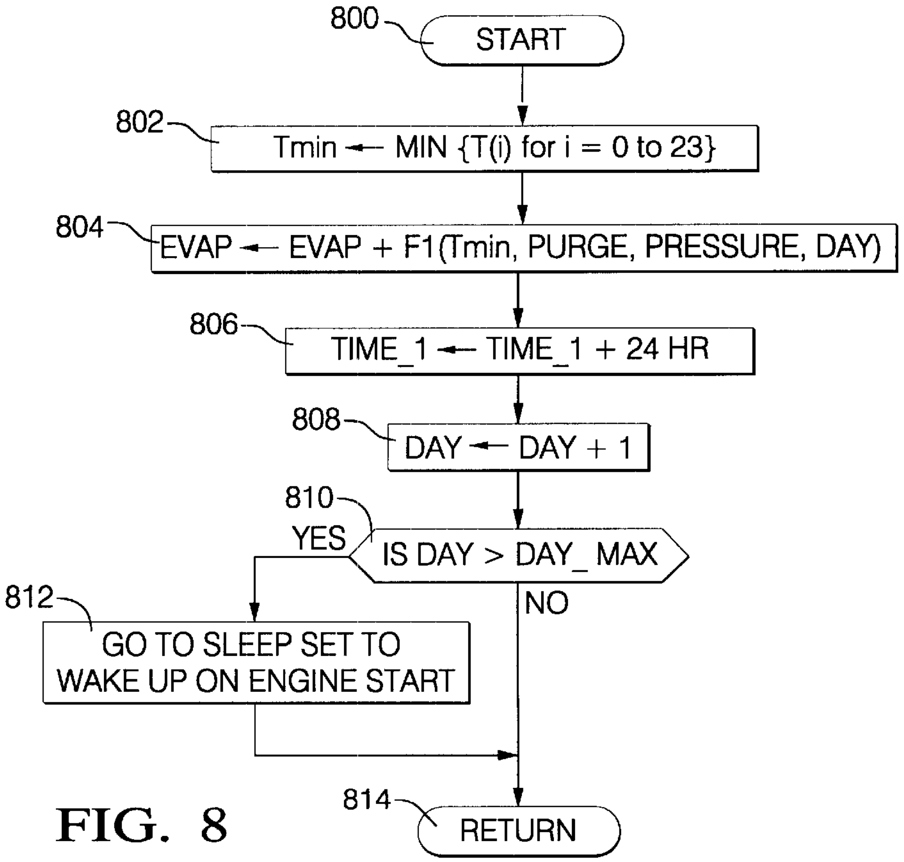
FIG. 8 is a computer diagram of a subroutine for a complete diurnal cycle.

The complete diurnal routine process is illustrated in FIG. 8, and the flow begins at block 800. Since the engine has been off for a period of more than 24 hours, temperature values T(i) have been entered for each of the hourly intervals from 0 through 23. Accordingly, at block 802, the program tests for the minimum temperature and the time (ix) of the first minimum temperature value (Tmin) which is then identified and recorded in a memory site labeled Tmin. At this stage, the diurnal routine proceeds to block 804 in which data is prepared for a measure of the cumulative evaporative emissions based on a first diurnal cycle of 24 hours. The cumulative evaporative emissions (EVAP) is a function of Tmin, the PURGE malfunction if present, the PRESSURE malfunction if present, and the value for the DAY for the diurnal cycle. The initialized value for EVAP is 0. The new data for EVAP is now based on the selected evaporative emissions model for the first day based on the minimum temperature and the purge and pressure malfunctions, if occurring.

The complete diurnal routine then flows to block 806 where the first time memory location, Time_1, is incremented by 24 hours. In block 808, the value of DAY is incremented by one day. At block 810, a test is made as to whether the engine has been shut off for the maximum number of days. The intent here is to reduce battery drainage since the engine has not been started for a period of days. A value is set for the maximum number of days, for example, three days, at which this diurnal cycle is stopped. If the maximum number of days has been reached, the process flows to a self-shut off block 812. If the maximum number of days has not been reached, the process returns from block 814 to the engine-off routine (FIG. 4) until such time as the engine has been started as noted at block 404.

Figure 9:
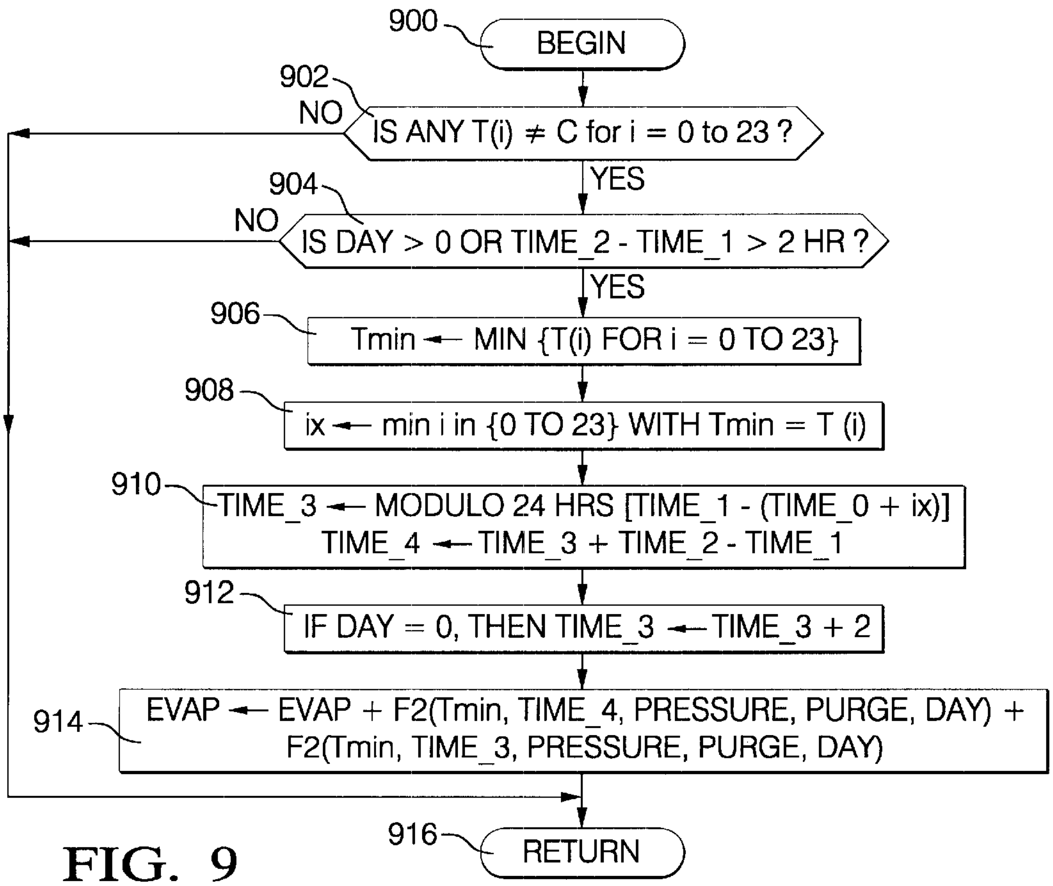
FIG. 9 is a computer flow diagram of a subroutine for a partial diurnal cycle.

After the process has cycled in the engine-off routine for a period less than 24 hours and it is then determined that the engine has started, block 404, the process leaves the engine-off routine and enters the partial diurnal routine, which is illustrated in FIG. 9. The partial diurnal subroutine begins at block 900 and immediately flows to test block 902. In test block 902, the process determines whether any values of temperature for the hourly intervals T(i) are other than the undefined value C. If the engine-off routine did not cycle long enough for any valid temperature to be recorded for an hourly interval, then the partial diurnal routine cycles to its return block 914 and from there to the main process sequence in FIG. 2.

However, if there are legitimate temperature values T(i), then the partial diurnal routine proceeds to test block 904. In block 904, a test determines whether more than one day has elapsed or whether the engine has been shut off for more than two hours. In other words, the test in block 904 determines whether the vehicle is past a predetermined hot soak period. If it has passed the hot soak period, then the process flows to block 906. In block 906, the minimum temperature (Tmin) is determined from those valid temperature recordings for whatever intervals are available in the last 24 hour period (which may include part of a previous diurnal or partial diurnal period). Since the process is in the partial diurnal routine, it is necessary to confirm that the values obtained are within the last 24 hour period.

Accordingly, the process moves to block 908. In block 908, the lowest of the interval numbers (i) associated with the minimum temperature and the lowest interval number of the minimum temperature is stored in a memory site ix. The value of ix is then used in block 910 to establish a value for Time_3 that is in the range of 0 to 24 hours. Time_3 is the modulo function of 24 hours applied to Time_1 minus the sum of Time_0 and the interval ix. Time_3 is the number of hours, less than 24, in the period after the diurnal cycle first reached a minimum temperature until the engine was shut off. A value for Time_4 is then established as the value of Time_3 plus the current clock (Time_2) minus Time_1, which was the start of the engine-off period. Time_4 is the number of hours in the period after the diurnal cycle first reached a minimum temperature and until the engine was started.

The process moves to block 912. In the case in which Day=0 and Time_2–Time_1 is greater than two hours, the value of Time_3 is increased by 2 for the purpose of the function of block 914.

Having established values for TIME_4 and TIME_3, the partial diurnal routine then proceeds to block 914 in which a cumulative evaporative emission value (EVAP) is obtained for the partial diurnal cycle. This calculation is based on a function of the minimum temperature (Tmin), TIME_4 and the presence or absence of PRESSURE and PURGE malfunctions (from OBDII) and DAY of the test plus a similar function based on the minimum temperature (Tmin), TIME_3 and the presence or absence of PRESSURE and PURGE malfunctions and DAY of the test. The emissions accumulated during this partial diurnal routine are added to the existing value of emissions and the total recorded in the memory site for EVAP. The process then returns, block 916, to the main process cycle in FIG. 2.

The partial diurnal subroutine is entered and executed at a time when the engine has been turned on following an engine-off period. The main process cycle thus is now in an engine-on mode and the process flows to the engine-on routine, which is described in FIG. 5. The engine-on routine begins at block 500 and flows to block 502, which is a test that determines if a malfunction indicator light (MIL) is on. If the malfunction indicator light is on, the process flows to block 504, which is a status-of-test routine.

Figure 10:
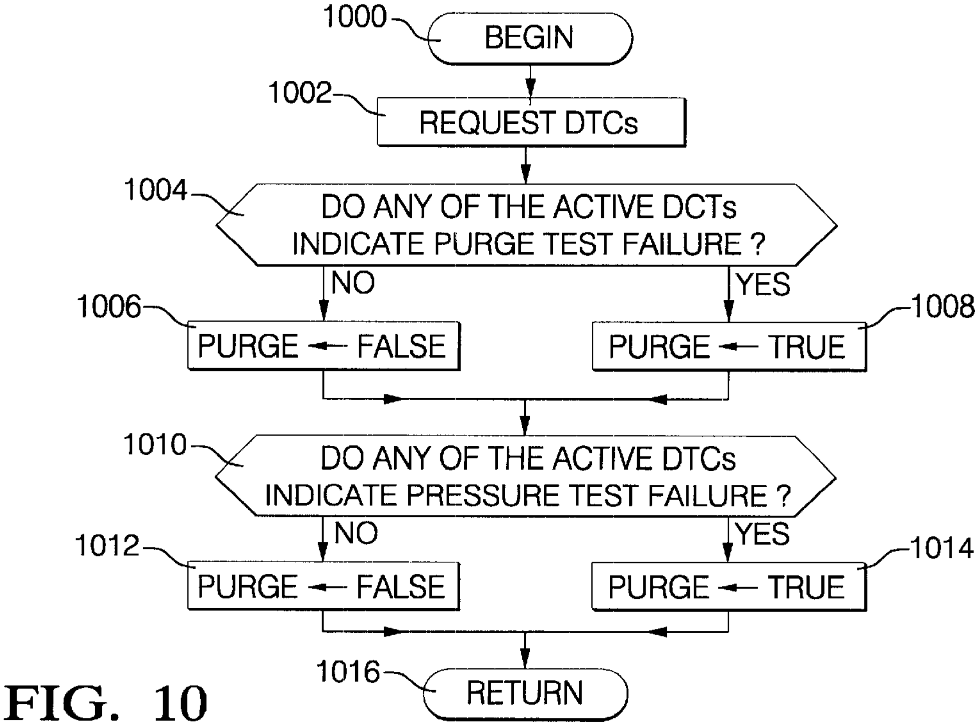
FIG. 10 is a computer flow diagram of a subroutine for a status-of-test process.

Status-of-test routine is described in FIG. 10. This routine begins at block 1000, flows to block 1002 in which the module microprocessor determines whether there have been any diagnostic trouble codes (DTCs) recorded by the OBDII system. The process then flows to block 1004 in which it is inquired as to whether any active diagnostic trouble codes reflect a PURGE problem with the evaporative emissions system. If there is no purge problem (block 1006), that information is stored as a False value. If there is a purge problem (block 1008), that information is stored in the nonvolatile memory as a True value. The status-of-test routine then flows to block 1010 in which it is inquired whether there are any active diagnostic trouble codes that reflect a PRESSURE problem with the evaporative emissions system. The presence or absence of these problems is reflected in blocks 1012 and 1014. The status routine then returns from block 1016 to the engine-on routine.

The engine-on routine checks for a request-for-download subroutine at block 506. If there has been a request for the evaporative emissions data (EVAP), that material is downloaded per the subroutine described in FIG. 6. The engine-on routine then proceeds to block 508 at which time the current clock value is recorded in the Time_2 memory location. The elapsed test time is then converted to integral hours, and that information is recorded in the H_1 memory location. The engine-on routine then flows to block 510 at which time the data in H_0 is compared to H_1. If they are equal, the process recycles to the is engine running determination block 516. If the values are not equal, the value for H_1 is stored in H_0 (block 512). An indeterminate value for temperature is stored in the temperature memory site for the H_1 (block 514).

Thus, in accordance with the above-described process, an on-board evaporative emissions module incorporating a temperature measuring element is employed to track time during an engine-off evaporative emissions test of the vehicle's systems. The practice provides routine data both as to the effect of diurnal or partial diurnal evaporative emission losses during a vehicle rest period. These determinations are made after the "hot soak" period following an engine shut down. The diurnal and partial diurnal evaporative losses are determined and stored along with losses attributable to malfunctions, if any, in the evaporative emissions system. This information then is available for an on-board calculation of such emissions or for downloading to a diagnostic service device.

While this invention has been described in terms of some specific embodiments, it will be appreciated that other forms can readily be adapted by one skilled in the art. Accordingly, the scope of this invention is to be considered limited only by the following claims.

What is claimed is:

1. A method of determining cumulative evaporative emissions of hydrocarbons from a vehicle during a test period, said vehicle having an engine that is operated under a microprocessor-based engine controller, a fuel evaporation emission control system comprising a fuel tank for hydrocarbon fuel and fuel vapor adsorption means connected to said fuel tank and said engine, and a self-diagnostic system that detects malfunctions in said fuel evaporation emission control system, said method comprising the steps of measuring the temperature at a location within said vehicle at regular, predetermined intervals of time during said test period when the engine is not running and recording said temperatures in a micro-processor readable memory, determining the lowest recorded temperature in a twenty-four hour period of said test as a basis for diurnal or partial diurnal cumulative emission determinations, and determining the cumulative evaporative emissions during said test period as a function of the cumulative effect of said diurnal and/or partial diurnal temperatures.

2. A method as recited in claim 1 comprising periodically interrogating said self-diagnostic system during engine operation for defects in said emission control system and recording said defects, if any, in said readable memory, and determining the cumulative evaporative emissions during said test period as a function of the cumulative effect of said malfunctions, if any, and the cumulative effect of said diurnal and/or partial diurnal temperatures.

3. A method as recited in claim 2 in which only temperatures measured after a predetermined engine-off hot soak period are used in the determination of said evaporative emissions.

4. A method as recited in claim 3 in which data is transferred from said microprocessor readable memory to a processor separate from said vehicle for determining said evaporative emissions.

5. A method as recited in claim 2 in which data is transferred from said microprocessor readable memory to a processor separate from said vehicle for determining said evaporative emissions.

6. A method as recited in claim 2 comprising determining the time of the first occurrence of said lowest recorded temperature as a basis for said emission determinations.

7. A method as recited in claim 1 in which only temperatures measured after a predetermined engine-off hot soak period are used in the determination of said evaporative emissions.

8. A method as recited in claim 7 in which data is transferred from said microprocessor readable memory to a processor separate from said vehicle for determining said evaporative emissions.

9. A method as recited in claim 1 in which data is transferred from said microprocessor readable memory to a processor separate from said vehicle for determining said evaporative emissions.

10. A method as recited in claim 1 comprising determining the time of the first occurrence of said lowest recorded temperature as a basis for said emission determinations.

* * * * *